(12) United States Patent
Muldoon et al.

(10) Patent No.: US 11,821,372 B2
(45) Date of Patent: Nov. 21, 2023

(54) HYBRID ELECTRIC ENGINE WITH ELECTRIC TIP CLEARANCE MECHANISM

(71) Applicant: RTX Corporation, Farmington, CT (US)

(72) Inventors: Marc J. Muldoon, Marlborough, CT (US); Arnab Roy, West Hartford, CT (US); John R. Farris, Lebanon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/837,829

(22) Filed: Jun. 10, 2022

(65) Prior Publication Data

US 2022/0397064 A1    Dec. 15, 2022

Related U.S. Application Data

(60) Provisional application No. 63/209,684, filed on Jun. 11, 2021.

(51) Int. Cl.
*F02C 7/32* (2006.01)
*B64D 27/16* (2006.01)
(Continued)

(52) U.S. Cl.
CPC ............... *F02C 7/32* (2013.01); *B64D 27/16* (2013.01); *B64D 27/24* (2013.01); *F01D 11/22* (2013.01);
(Continued)

(58) Field of Classification Search
CPC .......... F01D 11/08; F01D 11/14; F01D 11/20; F01D 11/22; B64D 27/16; B64D 27/24;
(Continued)

(56) References Cited

U.S. PATENT DOCUMENTS 10,400,620 B2    9/2019    Ribarov et al.
10,696,416 B2    6/2020    Gansler et al.
(Continued)

FOREIGN PATENT DOCUMENTS

EP    1624159 A1    2/2006

OTHER PUBLICATIONS

Extended European Search Report dated Nov. 14, 2022; EP Application No. 22178768.2; 7 pages.

*Primary Examiner* — Elton K Wong
(74) *Attorney, Agent, or Firm* — CANTOR COLBURN LLP

(57) ABSTRACT

A hybrid electric propulsion system including: a gas turbine engine comprising a low speed spool and a high speed spool, the low speed spool comprising a low pressure compressor and a low pressure turbine, and the high speed spool comprising a high pressure compressor and a high pressure turbine; an electric motor configured to augment rotational power of the high speed spool or the low speed spool; at least one blade outer air seal positioned between an outer case of the high pressure turbine and a plurality of blades of the high pressure turbine; a clearance control system operably coupled to the at least one blade outer air seal, the clearance control system configured to vary a position of the at least one blade outer air seal with respect to the plurality of blades of the high pressure turbine; and a controller operably coupled to the electric motor and the clearance control system, wherein the controller is configured to operate the clearance control system based upon an operational state of the electric motor.

20 Claims, 6 Drawing Sheets

(51) Int. Cl.
  *B64D 27/24* (2006.01)
  *F02C 6/14* (2006.01)
  *F01D 11/22* (2006.01)
  *B64D 27/02* (2006.01)

(52) U.S. Cl.
  CPC .......... *F02C 6/14* (2013.01); *B64D 2027/026* (2013.01); *F05D 2220/323* (2013.01); *F05D 2220/76* (2013.01)

(58) Field of Classification Search
  CPC ........ B64D 2027/026; F02C 7/32; F02C 6/14; F05D 2220/323; F05D 2220/76
  See application file for complete search history.

(56) References Cited

U.S. PATENT DOCUMENTS

| | | |
|---|---|---|
| 10,738,706 B2 | 8/2020 | Gansler et al. |
| 11,131,207 B1 | 9/2021 | Farris et al. |
| 2017/0328230 A1* | 11/2017 | Virkler .................. F04D 27/001 |
| 2018/0283464 A1* | 10/2018 | Altamura .................. F02C 7/32 |
| 2019/0002116 A1* | 1/2019 | Gansler .................. F01D 11/20 |
| 2021/0115857 A1 | 4/2021 | Collopy |

* cited by examiner

HYBRID ELECTRIC ENGINE WITH ELECTRIC TIP CLEARANCE MECHANISM

CROSS REFERENCE TO RELATED APPLICATIONS

This application claims priority to U.S. Provisional Patent Application No. 63/209,684 filed on Jun. 11, 2021, the contents of which are incorporated herein by reference thereto.

BACKGROUND

The subject matter disclosed herein relates generally to hybrid electric engines and, more particularly, to a method and an apparatus for control of a tip clearance mechanism with a hybrid electric engine and/or an engine with electric power assist.

It is desirable to minimize clearance between a rotor blade tip and a static outer shroud in order to increase efficiency of the engine while preventing tip rubbing during engine operation. Current systems can include pneumatic models or those using engine bleed air to control thermal expansion and contraction of casing components. However, pneumatic systems can add extra weight and/or cost that offset the corresponding improvements to engine efficiency. In addition, thermal systems can be slow, particularly during rapid throttle maneuvers.

Accordingly, it is desirable to provide a hybrid electric engine and/or an engine with electric power assist with a tip clearance mechanism that works in conjunction with the electric power assist.

BRIEF DESCRIPTION

Disclosed is a hybrid electric propulsion system including: a gas turbine engine comprising a low speed spool and a high speed spool, the low speed spool comprising a low pressure compressor and a low pressure turbine, and the high speed spool comprising a high pressure compressor and a high pressure turbine; an electric motor configured to augment rotational power of the high speed spool or the low speed spool; at least one blade outer air seal positioned between an outer case of the high pressure turbine and a plurality of blades of the high pressure turbine; a clearance control system operably coupled to the at least one blade outer air seal, the clearance control system configured to vary a position of the at least one blade outer air seal with respect to the plurality of blades of the high pressure turbine; and a controller operably coupled to the electric motor and the clearance control system, wherein the controller is configured to operate the clearance control system based upon an operational state of the electric motor.

In addition to one or more of the features described above, or as an alternative to any of the foregoing embodiments, the clearance control system includes an electromechanical actuator operably coupled to the at least one blade outer air seal, the electromechanical actuator configured to vary a position of the at least one blade outer air seal with respect to the plurality of blades of the high pressure turbine.

In addition to one or more of the features described above, or as an alternative to any of the foregoing embodiments, the hybrid electric propulsion system includes a power source operably coupled to the electric motor and the clearance control system.

In addition to one or more of the features described above, or as an alternative to any of the foregoing embodiments, the power source is at least one of the following: a battery; a super capacitor; and an ultra capacitor.

In addition to one or more of the features described above, or as an alternative to any of the foregoing embodiments, the clearance control system includes a maneuver sensor that senses changes in rotation and/or acceleration of the gas turbine engine and a position sensor that senses changes in a distance between a tip of the plurality of blades the at least one blade outer air seal.

In addition to one or more of the features described above, or as an alternative to any of the foregoing embodiments, the at least one blade outer air seal is a plurality of blade outer air seals.

In addition to one or more of the features described above, or as an alternative to any of the foregoing embodiments, the controller is a full authority digital engine control (FADEC).

In addition to one or more of the features described above, or as an alternative to any of the foregoing embodiments, the controller is a full authority digital engine control (FADEC) that has full authority over the power source, the electric motor and the clearance control system.

In addition to one or more of the features described above, or as an alternative to any of the foregoing embodiments, the motor is connected to an engine accessory gearbox that is operably coupled to the high speed spool.

In addition to one or more of the features described above, or as an alternative to any of the foregoing embodiments, the clearance control system includes an electromechanical actuator operably coupled to the at least one blade outer air seal, the electromechanical actuator configured to vary a position of the at least one blade outer air seal with respect to the plurality of blades of the high pressure turbine.

In addition to one or more of the features described above, or as an alternative to any of the foregoing embodiments, the clearance control system includes a maneuver sensor that senses changes in rotation and/or acceleration of the gas turbine engine and a position sensor that senses changes in a distance between a tip of the plurality of blades the at least one blade outer air seal.

In addition to one or more of the features described above, or as an alternative to any of the foregoing embodiments, the at least one blade outer air seal is a plurality of blade outer air seals.

In addition to one or more of the features described above, or as an alternative to any of the foregoing embodiments, the controller is a full authority digital engine control (FADEC).

In addition to one or more of the features described above, or as an alternative to any of the foregoing embodiments, the controller is a full authority digital engine control (FADEC) that has full authority over the power source, the electric motor and the clearance control system.

In addition to one or more of the features described above, or as an alternative to any of the foregoing embodiments, the motor is connected to an engine accessory gearbox that is operably coupled to the high speed spool.

In addition to one or more of the features described above, or as an alternative to any of the foregoing embodiments, the controller is a full authority digital engine control (FADEC).

In addition to one or more of the features described above, or as an alternative to any of the foregoing embodiments, the controller is a full authority digital engine control (FADEC) that has full authority over the power source, the electric motor and the clearance control system.

Also disclosed is a method for adjusting a position of a blade outer air seal of a gas turbine engine, the method including: providing power assist to a high speed spool of the gas turbine engine via an electric motor operably coupled to the high speed spool; varying a position of the blade outer air seal between an outer case of the gas turbine engine and a plurality of blades of the gas turbine engine via a clearance control system operably coupled to the blade outer air seal via a controller operably coupled to the electric motor and the clearance control system, wherein the controller is configured to operate the clearance control system based upon an operational state of the electric motor.

In addition to one or more of the features described above, or as an alternative to any of the foregoing embodiments, a power source is operably coupled to the electric motor and the clearance control system.

In addition to one or more of the features described above, or as an alternative to any of the foregoing embodiments, the controller is a full authority digital engine control (FADEC).

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
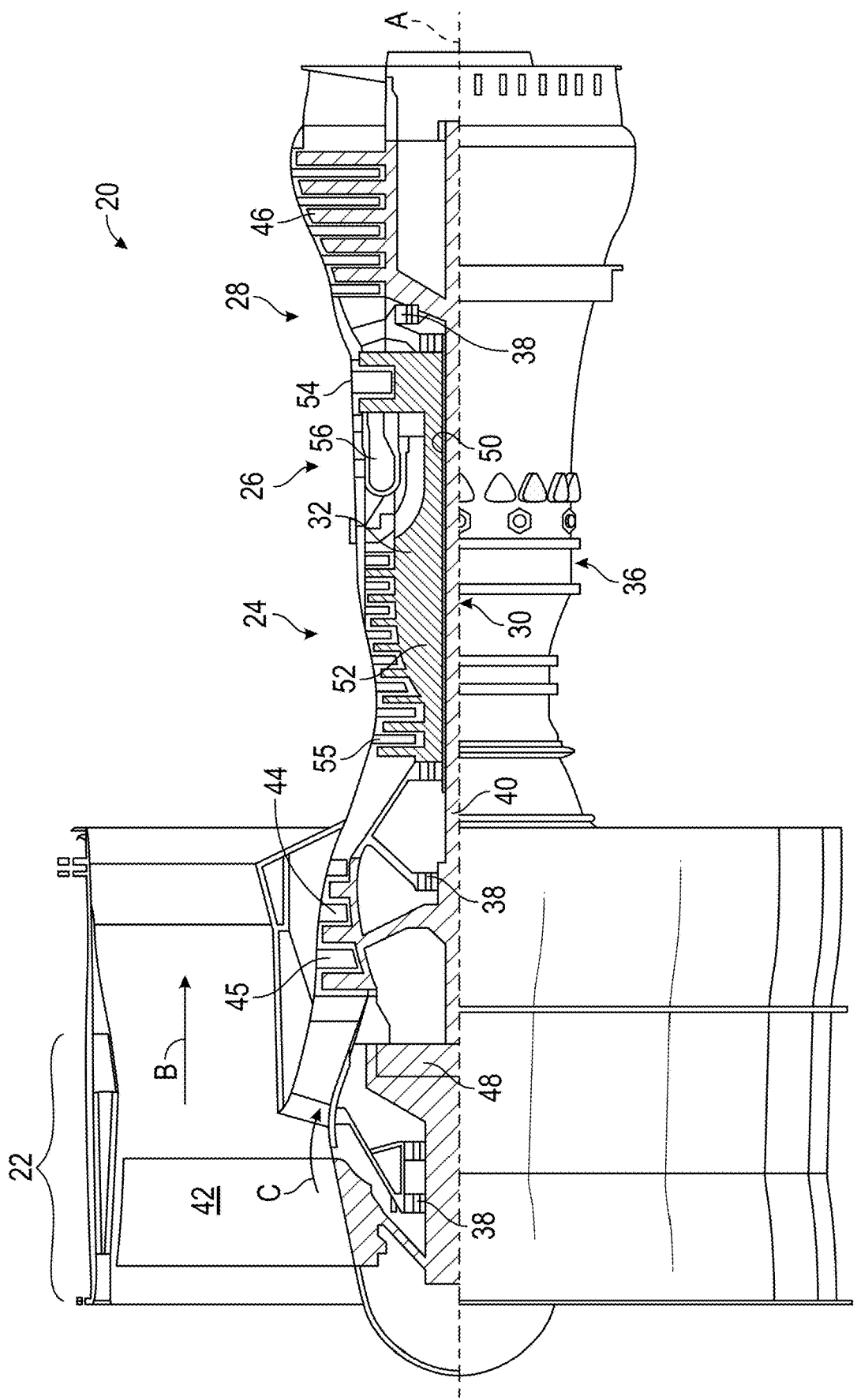
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
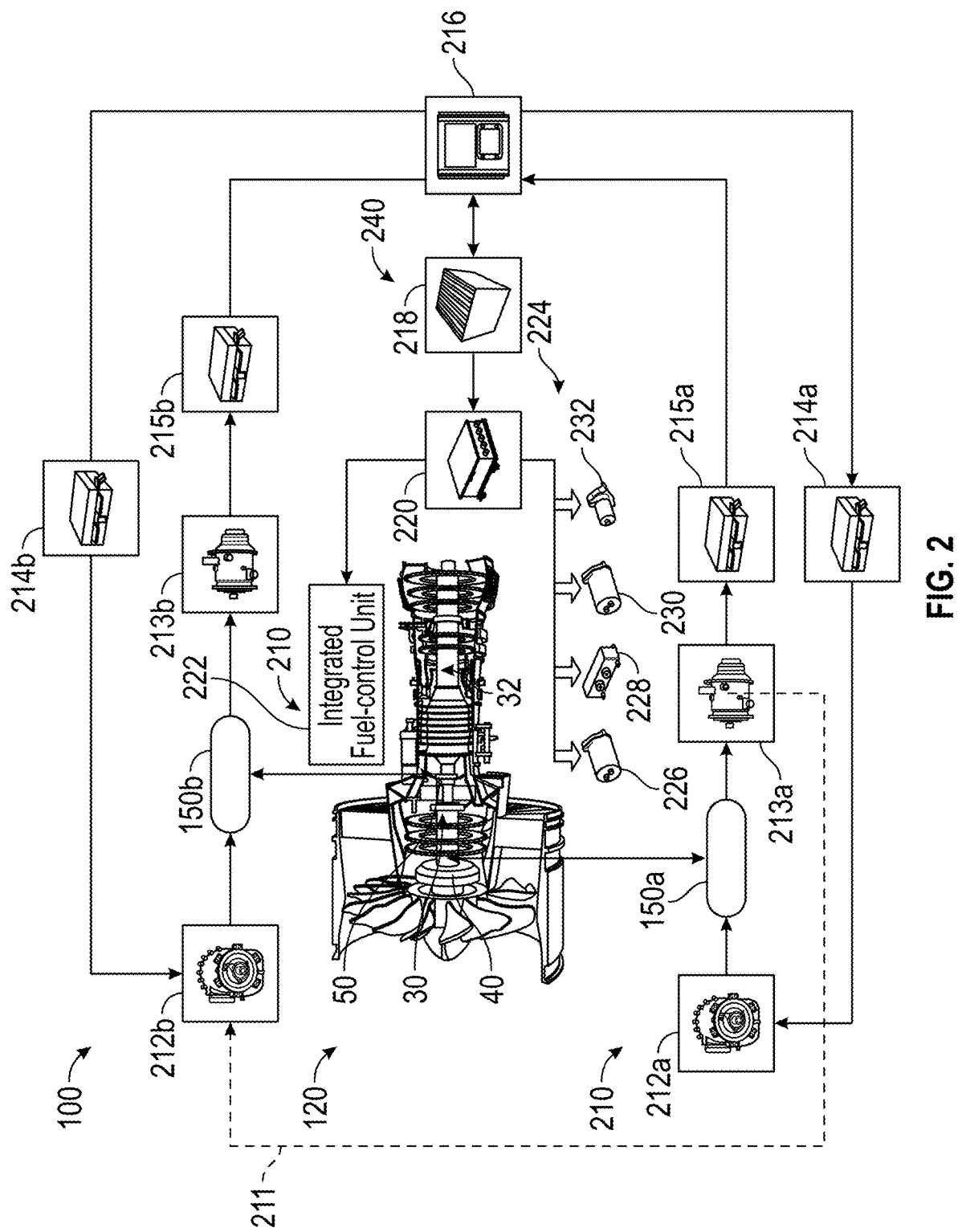
FIG. 2 is a schematic diagram of a hybrid electric propulsion system or hybrid electric engine with physical power flow connections (electrical and mechanical power), in accordance with an embodiment of the disclosure.

FIG. 2 illustrates a hybrid electric propulsion system 100 (also referred to as hybrid gas turbine engine or hybrid electric engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212B for rotation of the high speed spool as discussed below) or additional electric motors (not depicted). The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system or hybrid electric engine 100. For example, power from the first electric generator 213A can be transferred 211 to the second electric motor 212B as a low speed spool 30 to high speed spool 32 power transfer. Other examples of power transfers may include a power transfer from the second electric generator 213B to the first electric motor 212A as a high speed spool 32 to low speed spool 30 power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224, such as one or more of a low pressure compressor bleed valve actuator 226, a low pressure compressor vane actuator 228, a high pressure compressor vane actuator 230, an active clearance control actuator 232, and other such effectors. In some embodiments, the low pressure compressor vane actuator 228 and/or the high pressure compressor vane actuator 230 can be omitted where active control of stator vanes 45, 55 of FIG. 1 is not needed. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224 and/or other elements (not depicted).

In one non-limiting embodiment and through electrical boost provided to the high speed spool 32 and/or the low speed spool 30 variable vane actuators of the high speed spool 32 and/or the low speed spool 30 may be reduced and/or eliminated as the need for variable vanes may be reduced or eliminated.

Figure 3:
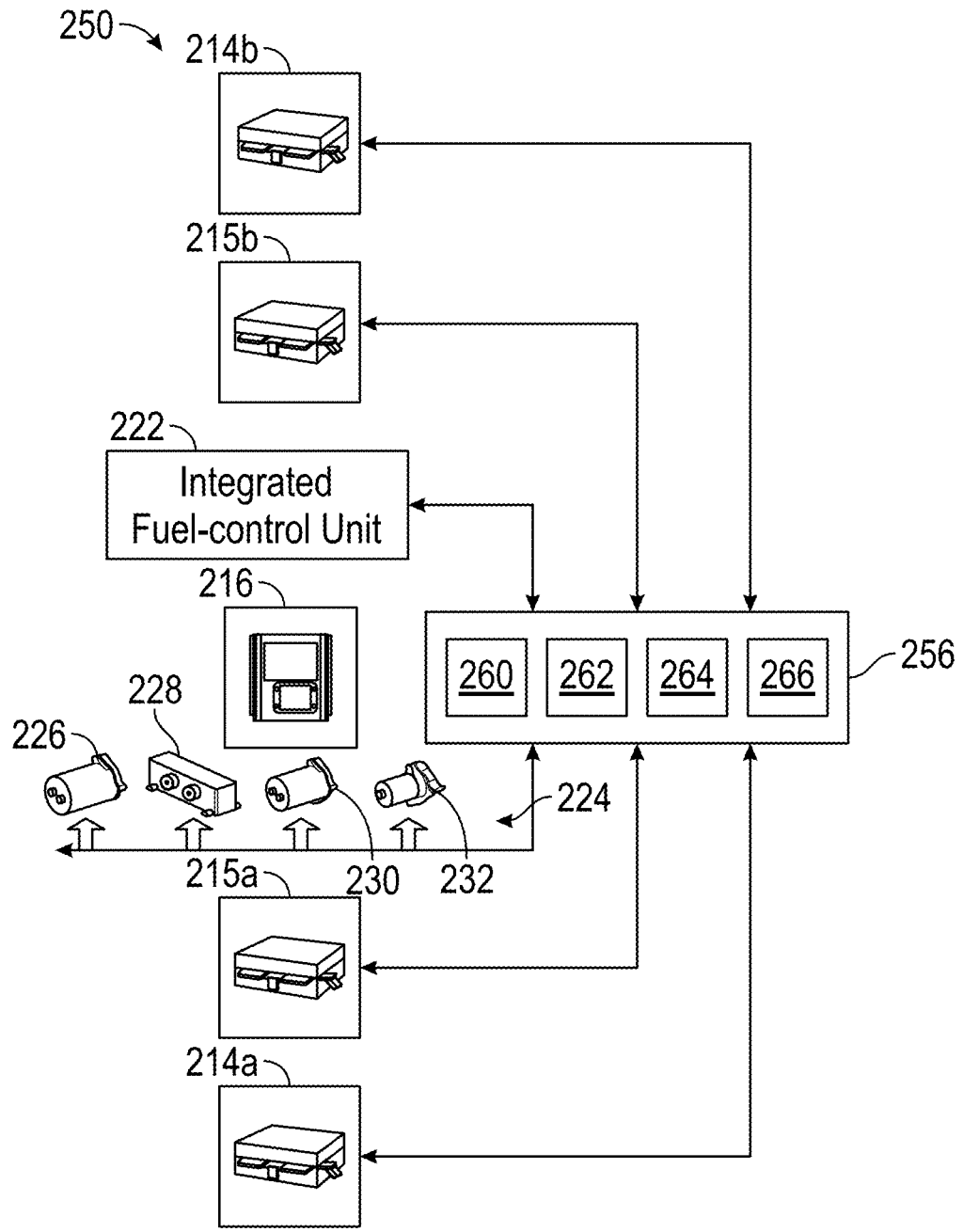
FIG. 3 is a schematic diagram of control signal paths of a hybrid electric propulsion system or hybrid electric engine, in accordance with an embodiment of the disclosure.

FIG. 3 is a schematic diagram of control signal paths 250 of the hybrid electric propulsion system or hybrid electric engine 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a power transfer control 266 that controls the hybrid electric system control effectors 240 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. The controller 256 provides a means for controlling the hybrid electric system control effectors 240 based on a power transfer control 266 that is dynamically updated during operation of the hybrid electric propulsion system or hybrid electric engine 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, and the like can be used to establish operational schedules and transition limits to maintain efficient operation of the gas turbine engine 120.

Figure 4:
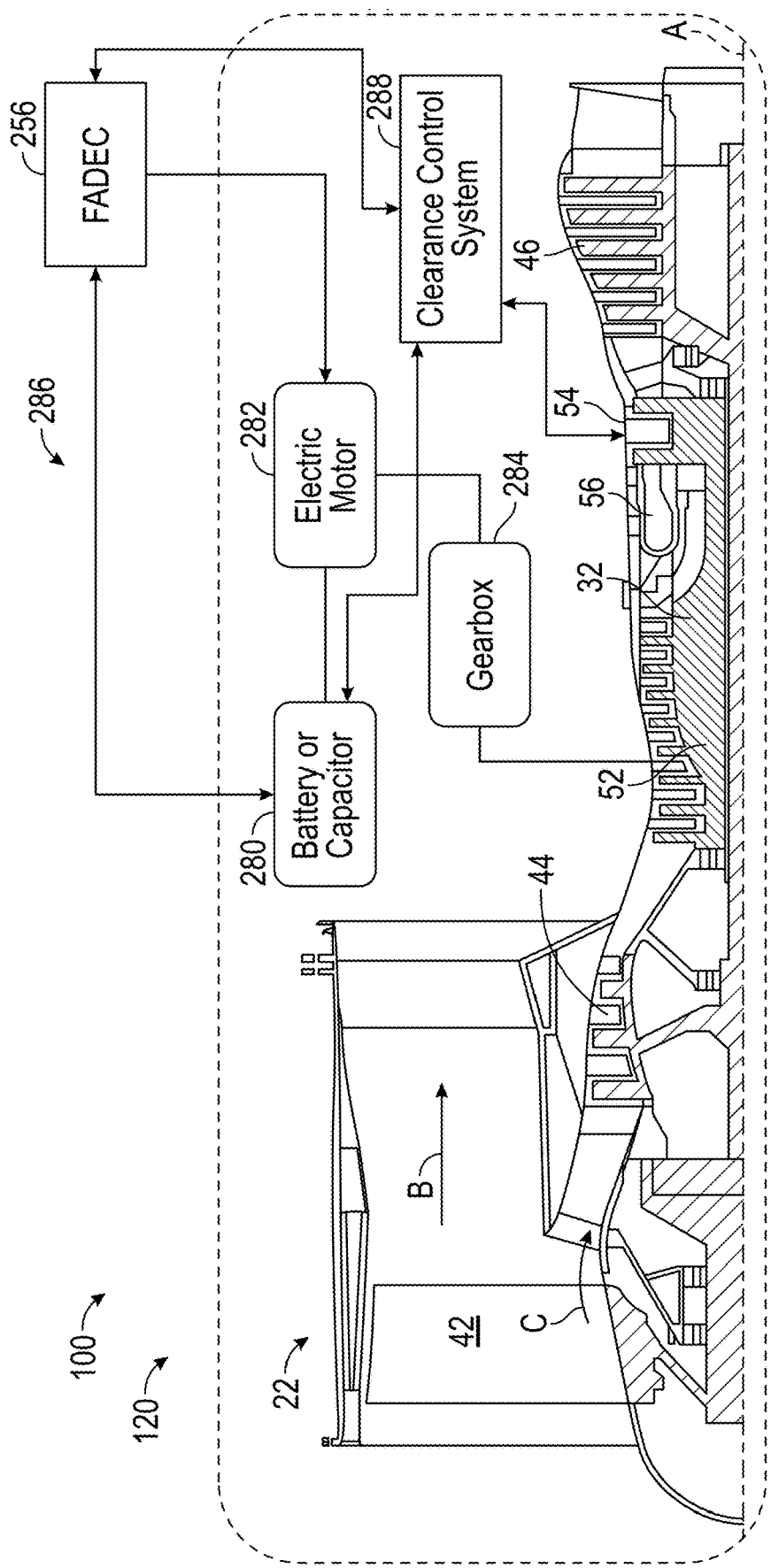
FIG. 4 is a partial cross-sectional illustration of a hybrid electric propulsion system or hybrid electric engine, with an electric clearance control system in accordance with an embodiment of the disclosure.

Referring now to FIG. 4, a hybrid electric propulsion system 100 (also referred to as hybrid gas turbine engine or hybrid electric engine 100) including a gas turbine engine 120 operably coupled to an electrical power system 210 as part of a hybrid electric aircraft in accordance with one non-limiting embodiment of the present disclosure is illustrated. In this embodiment, the engine 120 has a power source 280 such as a battery, a super capacitor, an ultra capacitor or an equivalent thereof, which supplies power to a motor 282, which is connected to an engine accessory gearbox 284 that is operably coupled to the high speed spool 32 such that the motor 282, when operated will provide power assist to the high speed spool 32 via the accessory gearbox 284. In other words, the accessory gearbox will have at least one component (e.g., a gear train or other equivalent device) operably coupled to the high speed spool 32 and the motor 282 such that operation of the motor 282 will rotate the component which in turn will rotate the high speed spool 32.

In one non-limiting embodiment, motor 282 may be motor 212B of the embodiment illustrated in FIG. 2, which is configured to provide power assist to the high speed spool 32.

In an alternative embodiment, motor 282 may be operatively coupled to the low speed spool 30 via accessory gearbox 284 in order to provide additional thrust to the engine 20.

The system may be referred to a power assist system 286 that limits or avoids pilot or aircraft control intervention during operation and the full authority digital engine control (FADEC) controls the power source and the engine.

The power assist to the high speed spool 32 via the motor 282 will allow for tighter clearances between the outer edges of turbine blades (blade tips) and inner surfaces of rotor case shrouds or blade outer air seals. For example, in a non-hybrid engine without electric assist it may be desirable to increase a clearance between the turbine blades and the blade outer air seal during an acceleration of the engine to allow components of the turbine section (e.g., blades, etc.) to expand due to the increased temperature to which they are exposed. For example, higher combustion associated with the acceleration will in turn cause temperature increases in the turbine section, which in turn, requires an increase in clearance to avoid tip rubbing since the components will expand when heated. Conversely, it is desirable to decrease the clearance between the blade tips and the blade outer air seals during operation of the engine at steady-state operating conditions in order to increase an efficiency of the engine since there is not as much of a temperature fluctuation during steady-state operating conditions. As used herein and with reference to turbine blades and their associated blade outer air seals, efficiency is referred to as minimizing tip leakage in order to prevent aerodynamic loss.

In addition and in combination with the power assist system 286, the hybrid electric engine 100 includes a clearance control system or active clearance control system 288. As will discussed below, the clearance control system 288 can control the clearance between the tips of turbine blades and an associated blade outer air seal.

Figure 5:
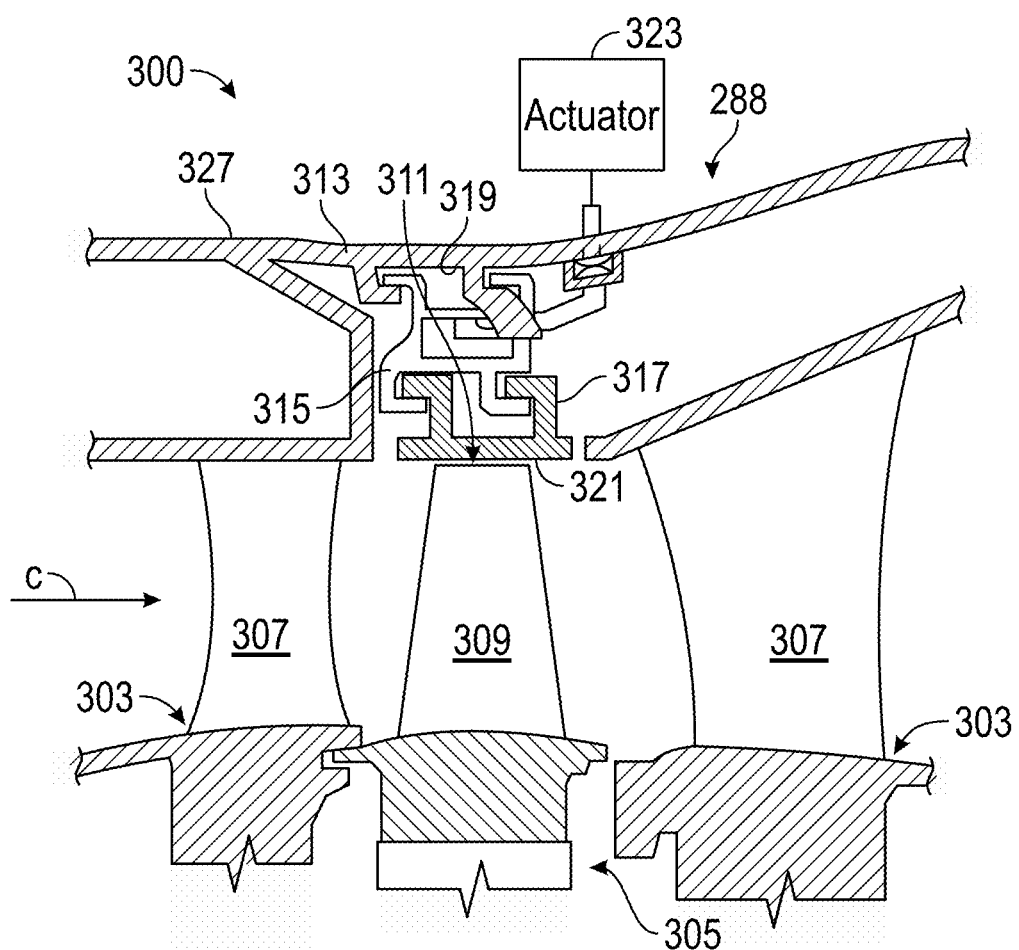
FIG. 5 is a cross-sectional view of a turbine section of the hybrid electric propulsion system or hybrid electric engine with an electric clearance control system in accordance with an embodiment of the disclosure.

Referring now to FIG. 5, a partial cross-section showing a portion of a high pressure turbine 300 of the hybrid electric engine 100 is provided. The high pressure turbine 300 includes alternating rows of stator assemblies 303 and rotor assemblies 305 (only one of which is shown). Each stator assembly 303 includes vanes 307 for directing core airflow C and each rotor assembly 305 includes a plurality of turbine blades 309 for extracting energy from core airflow C. Each blade 309 includes a blade tip 311. High pressure turbine 300 further includes various components positioned radially outward from assemblies 303 and 305 including case 313, carrier 315, and blade outer air seal (BOAS) 317. Beginning at a radially outermost point, case 313 can be an annular structure for housing assemblies 303 and 305. Carrier 315 can be mounted to a radially inner side 319 of case 313 by, for example, hooks or other suitable attachment means. BOAS 317 can be positioned radially inward of and mounted to carrier 315, also using hooks or other suitable attachment means. A tip clearance T (labeled in FIG. 6) is the space between inner side 321 of BOAS 317 and blade tip 311. In an exemplary embodiment, BOAS 317 can be arranged as multiple segments forming a ring around rotor assembly 305. In such an embodiment, several BOAS 317 segments can be mounted to a single carrier 315. Similarly, carrier 315 can be a single, annular structure, or arranged as multiple segments. In an alternative embodiment, carrier 315 can be eliminated such that BOAS 317 is mounted directly to inner side 319 of case 313.

The high pressure turbine 300 further includes active clearance control system 288 for maintaining a desired tip clearance T between BOAS 317 and blade tip 311. It should be understood by one skilled in the art that one or more clearance control systems 288 can, in alternative embodiments, be installed in various locations within compressor section 24 and/or turbine section 28 of hybrid electric engine 100. Clearance control system 288 includes structural and sealing components of high pressure turbine 300 including case 313, carrier 315, and BOAS 317. Clearance control system 288 further includes one or more actuators 323, and one or more sensing systems 325 (shown in FIG. 6). In FIG. 5, actuator 323 is shown mounted to an outer side 327 of case 313. Actuator 323 can be an electromechanical actuator having an electric drive motor, and can be made from relatively high temperature materials suitable for the operating environment of high pressure turbine 300 or other sections of hybrid electric engine 100. In an exemplary embodiment, a number of actuators (e.g., ranging from about 8-20) can be mounted circumferentially around case 313, the exact number depending, for example on the size of hybrid electric engine 100, and more specifically, the size and configuration of any of case 313, carrier 315, and BOAS 317. Alternative embodiments can include more or fewer actuators 323, as required for operation of clearance control system 288.

In one non-limiting embodiment, actuator 323 may be actuator 232 of the embodiment illustrated in FIG. 2.

Figure 6:
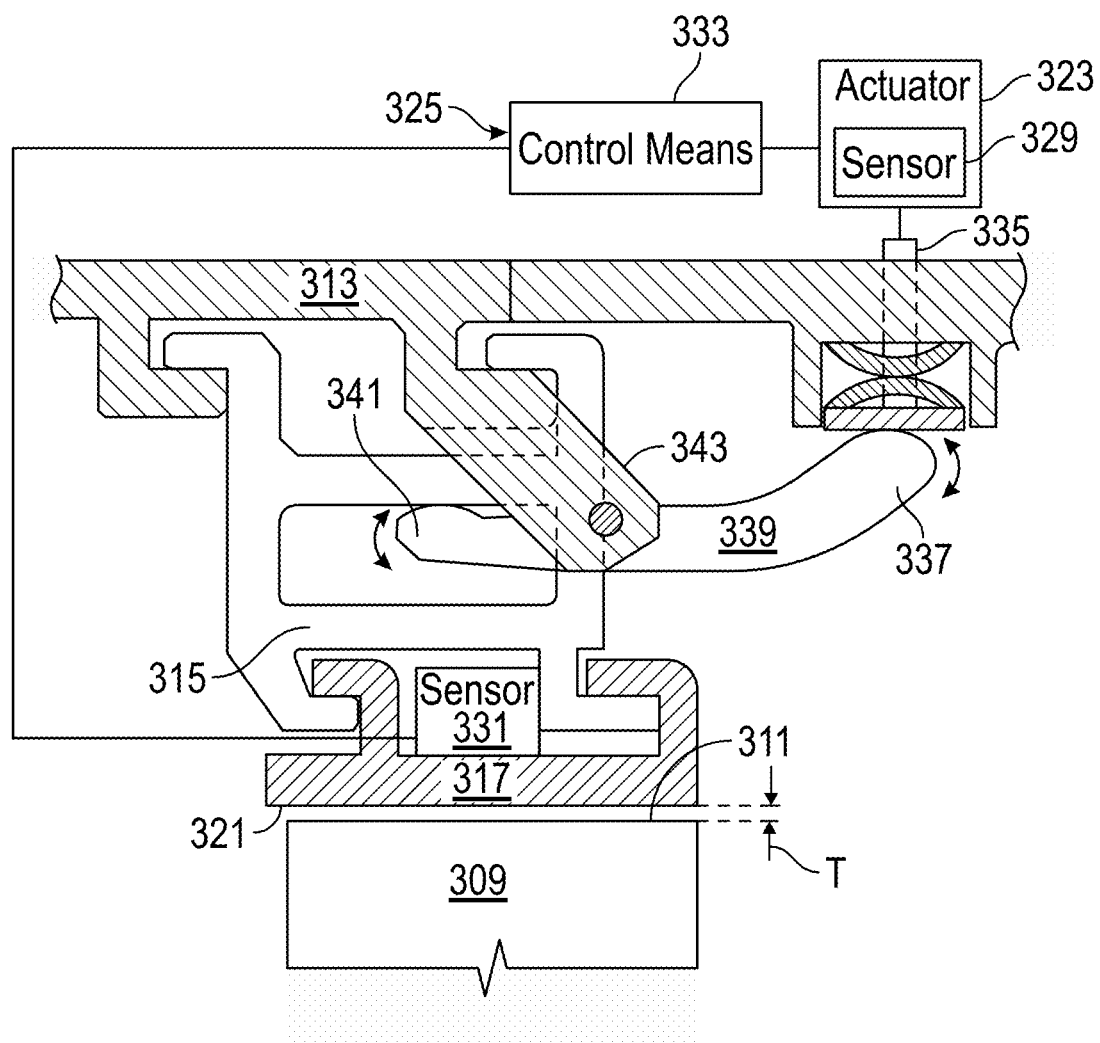
FIG. 6 is an enlarged view of components of the electrically actuated clearance control system of FIG. 5.

FIG. 6 is an enlarged view of components of clearance control system 288 of FIG. 5, including components of sensing system 325. Sensing system 325 includes maneuver sensor 329, position sensor 331, and control means 333. Maneuver sensor 329 can be, for example, a gyroscope or accelerometer (e.g., uni- or multi-axial) used to sense, respectively, rotational motion and acceleration of hybrid electric engine 100. As shown in FIG. 6, maneuver sensor 329 is collocated with actuator 323 and more specifically, actuator 323 both houses maneuver sensor 329 and includes the requisite circuitry for supporting functions of maneuver sensor 329. Position sensor 331, as shown, is positioned radially between carrier 315 and BOAS 317, and can be mounted to either structure, depending on factors such as sensor geometry, spatial constraints, etc. In an exemplary embodiment, position sensor 331 is a microwave position sensor for sensing tip clearance T. This parameter can include actual tip clearance or tip clearance derived from a sensed relative radial position of BOAS 317 with respect to a reference point. Position sensor 331 can alternatively be another type of position sensor for sensing tip clearance T. Other suitable locations for each of maneuver sensor 329 and position sensor 331 are contemplated herein.

Control means 333 can be a controller or other suitable control system such as controller 256 (FIG. 2) for receiving output signals representing sensed data from maneuver sensor 329 and position sensor 331 and signaling operation of actuator 323 in response to the sensed data. Control means 333 can include a control logic algorithm with a predetermined value or range of values for tip clearance T, as is discussed below in greater detail. In one embodiment, control means 333 can be separate from controller 256 and can be collocated with actuator 323, such as being housed within actuator 323, or being incorporated into a line replaceable unit (LRU) with actuator 323. Control means 333 can also be remotely located based on, for example, thermal or spatial limitations.

With continued reference to FIGS. 5 and 6, rotor assembly 305 is initially positioned such that the desired tip clearance T is present between inner side 321 of BOAS 317 and blade tip 311 during steady state operating conditions of hybrid electric engine 100. The value of tip clearance T can change throughout the flight envelope due to changes in engine power (e.g., high or low throttle conditions) causing thermal expansion or contraction, as well as centrifugal forces acting on gas turbine engine 10. However, the hybrid electric engine 100 can provide supplemental power to the engine via electric motor 282 and thus the clearance control system 288 is able to operate based upon power provided to the engine 100 via electric motor 282 as well as power provided via combustion of fuel via combustor 56.

Maneuver sensor 329 senses changes in rotation and/or acceleration of the engine that can be indicative of sudden maneuvering or change in engine power. Control means 333 receives maneuver sensor 329 data as a first output signal. Similarly, position sensor 331 senses changes in the value of tip clearance T which are received by control means 333 as a second output signal. Data from each sensor 329 and 331 can be continuously provided to control means 333, or scheduled if desired. Further, each sensor 329 and 331 can operate independently of the other such that a failure of one does not impact the operation of the other. Still further, control means 333 receives data indicative of the power provided to the engine 100 via electric motor 282 such as voltage provided to motor 282 or the amount of torque being provided by motor 282 as well as power provided via combustion of fuel via combustor 56, e.g. throttle position or fuel flow rate.

The sensed data is compared to the model of predetermined tip clearance T values, and control means 333 can adjust, using actuator 323, the position of BOAS 317 as necessary to maintain the desired value of tip clearance T.

As shown in FIG. 6, a plunger 335 of actuator 323 is in operational contact with a first end 337 of a lever 339. A second end 341 of lever 339 is in operational contact with carrier 315. Lever 339 can be connected to a projection 343 of case 313 at a point between first end 337 and second end 341 such that lever 339 can pivot about its attachment point. When an adjustment of tip clearance T is required (as indicated by sensor data), control means can signal actuator 323 to extend and retract plunger 335 and cause lever 339 pivot about its attachment point. This causes second end 341 to move carrier 315 and thereby BOAS 317, to which it is attached. BOAS 317 can be moved radially outward or inward in this manner, as required to maintain a desired tip clearance T.

In one non-limiting exemplary embodiment, active clearance control system 288 is at least semi-autonomous with sensing system 325 operating as a closed loop system. In such an embodiment, control means 333 can operate independently of the full authority digital electronic control (FADEC) of hybrid electric engine 100. Whereas some existing active clearance control systems are activated by the FADEC based on throttle lever position, a closed loop sensing system 325 can continuously monitor and maintain tip clearance T throughout the flight envelope, instead of only those portions of the flight where the throttle lever position or change of position is sufficient to trigger operation of the clearance control system. This allows for real-time adjustment of tip clearance T and increased efficiency of hybrid electric engine 100. In an alternative embodiment, it may be desirable to allow inputs from the FADEC to enhance efficiency of the feedback loop and additionally or alternatively to allow for control means 333 to provide data to the FADEC and airframe as a failsafe feature and/or data-tracking purposes. It should be understood that alternative embodiments can further include various other types, numbers, and/or groupings of actuators, sensors, control means, etc., as required for desired operation of the active clearance control system.

For example and in one non-limiting embodiment, a computer model can be resident upon the FADEC that predicts clearances and uses feedback from the active clearance control system to continuously revise its forecast on the future clearance target. As such, the FADEC could use information that a throttle change has occurred to begin actuator changes prior to receiving sensor data, which may increase the response time of the active clearance control system 288. Still further and in one non-limiting embodiment, the active clearance control system 288 may be at least semi-autonomous and operate in cooperation with the FADEC.

The disclosed active clearance control system has many benefits. It works more quickly than thermal systems and pneumatic systems, as it can sense and adjust tip clearance, in real time. Moreover, the clearance control system when associated with a hybrid electric engine provides additional benefits as the supplemental power provided by the electric motor 282 can reduce operational conditions of the engine where the clearance control system will be required. Still further and as illustrated in at least FIG. 4 the clearance control system 288 can also be powered by the same power source 280. Because the clearance control system 288 can operate to maintain a desired clearance throughout the flight envelope, it may also obviate the need for rotor stage abradable seal systems. Instead, blade tips and corresponding radially outer static surfaces (e.g., the BOAS) could be coated with suitable high-temperature materials. This could increase the useful life of components while also reducing weight.

Although one configuration of a clearance control system 288 is illustrated it is understood that various embodiments of the present disclosure are not limited to the specific clearance control system illustrated herein.

Although depicted being operable with the high pressure turbine 54, in other exemplary embodiments, the active clearance control system 288 may further be operable with, e.g., the low pressure turbine 46 or even in the compressor sections of the engine. Additionally, in other exemplary embodiments of the present disclosure, the active clearance control system 288 may have any other suitable configuration.

In one embodiment and as mentioned above, the controller 256 can control and monitor for fault conditions of the gas turbine engine 120 and/or the electrical power system 210. For example, the controller 256 can include a processing system 260, a memory system 262, and an input/output interface 264.

The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. Thus, the controller 256 provides a means for controlling the hybrid electric system control effectors 240 based on a power transfer control 266 that is dynamically updated during operation of the hybrid electric propulsion system or hybrid electric engine 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, fuel flow, power provided by motor 282 and the like can be used to establish operational schedules and transition limits to maintain efficient operation of the gas turbine engine 120.

As such, the controller 256 is capable of determining when the clearance control system 288 is to be activated by sensing the aforementioned parameters related to speed, flow rate, pressure ratios, temperature, thrust, fuel flow, power provided by motor 282 and the like. Once, the controller determines that the engine 120 is in an operating condition that requires actuation of the clearance control system 288 it causes power to be supplied from a power source 280 to the clearance control system 288 in order to provide the desired tip clearance.

For example and in one operational condition, if an acceleration command is provided to the engine and the electric motor 282 is already providing supplemental power to the engine or a state of charge of the power source 280 is below a pre-determined level where the electric motor 282 can provide supplemental power to the engine, the clearance control system 288 may be actuated to increase the tip clearance as the acceleration command would require the high pressure turbine to experience an increase in temperature due to the acceleration command. Alternatively and if an acceleration command is provided to the engine and the electric motor 282 is not providing supplemental power to the engine and a suitable amount of charge is available in the power source, the clearance control system 288 may be actuated in a different manner as the acceleration command may cause the high pressure turbine to experience a different increase in temperature or lack thereof due to the acceleration command. As such and in one non-limiting embodiment, the controller 256 is configured to operate the clearance control system 288 based upon an operational state of the electric motor 282.

In a deceleration event, fuel flow will decrease and airfoil temps will also drop but the low spool generator may be supplying power to the high spool motor in order to maintain compressor stall margin, so actuation of the clearance control system 288 may be controlled in a manner to account for pre-deceleration high pressure turbine (HPT) centrifugal effects but with reduced temperature effects.

As used herein radially outward is intended to be in the direction away from the engine central longitudinal axis A.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system comprising:
    a gas turbine engine comprising a low speed spool and a high speed spool, the low speed spool comprising a low pressure compressor and a low pressure turbine, and the high speed spool comprising a high pressure compressor and a high pressure turbine;
    an electric motor configured to augment rotational power of the high speed spool or the low speed spool;
    at least one blade outer air seal positioned between an outer case of the high pressure turbine and a plurality of blades of the high pressure turbine;
    a clearance control system operably coupled to the at least one blade outer air seal, the clearance control system varying a position of the at least one blade outer air seal with respect to the plurality of blades of the high pressure turbine based upon an operational state of the electric motor; and
    a controller operably coupled to the electric motor and the clearance control system, wherein the controller is configured to operate the clearance control system based upon the operational state of the electric motor.

2. The hybrid electric propulsion system as in claim 1, wherein the clearance control system includes an electromechanical actuator operably coupled to the at least one blade outer air seal, the electromechanical actuator configured to vary a position of the at least one blade outer air seal with respect to the plurality of blades of the high pressure turbine.

3. The hybrid electric propulsion system as in claim 1, further comprising a power source operably coupled to the electric motor and the clearance control system.

4. The hybrid electric propulsion system as in claim 3, wherein the power source is at least one of the following a battery or a super capacitor.

5. The hybrid electric propulsion system as in claim 4, wherein the clearance control system includes an electromechanical actuator operably coupled to the at least one blade outer air seal, the electromechanical actuator configured to vary a position of the at least one blade outer air seal with respect to the plurality of blades of the high pressure turbine.

6. The hybrid electric propulsion system as in claim 5, wherein the clearance control system includes a maneuver sensor that senses changes in rotation and/or acceleration of the gas turbine engine and a position sensor that senses changes in a distance between a tip of the plurality of blades and the at least one blade outer air seal.

7. The hybrid electric propulsion system as in claim 6, wherein the at least one blade outer air seal is a plurality of blade outer air seals.

8. The hybrid electric propulsion system as in claim 6, wherein the controller is a full authority digital engine control (FADEC).

9. The hybrid electric propulsion system as in claim 6, wherein the controller is a full authority digital engine control (FADEC) that has full authority over the power source, the electric motor and the clearance control system.

10. The hybrid electric propulsion system as in claim 6, wherein the motor is connected to an engine accessory gearbox that is operably coupled to the high speed spool.

11. The hybrid electric propulsion system as in claim 10, wherein the controller is a full authority digital engine control (FADEC).

12. The hybrid electric propulsion system as in claim 10, wherein the controller is a full authority digital engine control (FADEC) that has full authority over the power source, the electric motor and the clearance control system.

13. The hybrid electric propulsion system as in claim 3, wherein the controller is a full authority digital engine control (FADEC) that has full authority over the power source, the electric motor and the clearance control system.

14. The hybrid electric propulsion system as in claim 1, wherein the clearance control system includes a maneuver sensor that senses changes in rotation and/or acceleration of the gas turbine engine and a position sensor that senses changes in a distance between a tip of the plurality of blades and the at least one blade outer air seal.

15. The hybrid electric propulsion system as in claim 1, wherein the at least one blade outer air seal is a plurality of blade outer air seals.

16. The hybrid electric propulsion system as in claim 1, wherein the controller is a full authority digital engine control (FADEC).

17. The hybrid electric propulsion system as in claim 1, wherein the motor is connected to an engine accessory gearbox that is operably coupled to the high speed spool.

18. A method for adjusting a position of a blade outer air seal of a gas turbine engine, comprising:
    providing power assist to a high speed spool of the gas turbine engine via an electric motor operably coupled to the high speed spool;
    varying a position of the blade outer air seal between an outer case of the gas turbine engine and a plurality of blades of the gas turbine engine via a clearance control system operably coupled to the blade outer air seal via a controller operably coupled to the electric motor and the clearance control system, wherein the controller is configured to operate the clearance control system based upon an operational state of the electric motor.

19. The method as in claim 18, wherein a power source is operably coupled to the electric motor and the clearance control system.

20. The method as in claim 18, wherein the controller is a full authority digital engine control (FADEC).

* * * * *